(12) United States Patent  
Chen

(10) Patent No.: US 9,149,887 B2  
(45) Date of Patent: Oct. 6, 2015

(54) LASER PROCESSING APPARATUS

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 244 days.

(21) Appl. No.: 13/910,126

(22) Filed: Jun. 5, 2013

(65) Prior Publication Data

US 2014/0116998 A1    May 1, 2014

(30) Foreign Application Priority Data

Oct. 30, 2012  (TW) ............................. 101140207 A

(51) Int. Cl.
- B22C 13/00 (2006.01)
- B23K 26/02 (2014.01)
- B23K 26/04 (2014.01)
- B23K 26/36 (2014.01)

(52) U.S. Cl.
CPC .............. *B23K 26/048* (2013.01); *B22C 13/00* (2013.01); *B23K 26/02* (2013.01); *B23K 26/04* (2013.01); *B23K 26/36* (2013.01)

(58) Field of Classification Search
CPC ........ B22C 13/00; B23K 26/02; B23K 26/04; B23K 26/36
USPC ........ 219/121.61, 121.62, 121.83; 250/201.2, 250/215, 221, 234, 492.1; 164/456; 324/662
See application file for complete search history.

(56) References Cited

U.S. PATENT DOCUMENTS

| | | | | |
|---|---|---|---|---|
| 3,796,251 A | * | 3/1974 | Jasson et al. | ............... 164/166 |
| 5,961,861 A | * | 10/1999 | McCay et al. | ............ 219/121.83 |
| 6,863,113 B2 | * | 3/2005 | El-Demallawy et al. | ....... 164/17 |
| 7,795,560 B2 | * | 9/2010 | Chen | ......................... 219/121.75 |
| 2003/0047542 A1 | * | 3/2003 | Ehlers et al. | ............. 219/121.63 |

* cited by examiner

*Primary Examiner* — Samuel M Heinrich  
(74) *Attorney, Agent, or Firm* — Novak Druce Connolly Bove + Quigg LLP

(57) ABSTRACT

A laser processing apparatus includes worktable for loading a workpiece, a laser emitter, a user interface, a detecting unit, and a controller. The user interface allows inputting a thickness value of the workpiece. The detecting unit includes a signal emitter, a signal receiver for receiving signals emitted by the signal emitter, and a lifting unit. The workpiece is positioned between the signal emitter and the signal receiver. The controller controls the lifting device to adjust a height of the signal emitter and signal receiver relative to the worktable to be equal to a sum of the input thickness value and a focal length of the laser emitter. The controller controls the driving device to adjust a height of the laser emitter relative to the worktable if the signal receiver receives the signals and stop to adjust the laser emitter if the signal receiver does not receive the signals.

9 Claims, 3 Drawing Sheets

LASER PROCESSING APPARATUS

BACKGROUND

1. Technical Field

The present disclosure relates to laser processing apparatuses and, particularly, to a laser processing apparatus for processing a core of a mold.

2. Description of Related Art

Laser processing apparatuses generally include a worktable, a laser emitter, and a driving device connected to the laser emitter. In operation, a workpiece is positioned on the worktable, then the laser emitter is driven by the driving device to adjust a height of the laser emitter relative to the worktable and thus to position a focus of the laser emitter on the workpiece. Typically, the thickness of the workpiece is a factor of the adjustment and can be input into a computer which controls the adjustment by an operator. However, if the thickness of the workpiece is wrongly input, the driving element will adjust the laser to a wrong height. Therefore, a processing precision of the laser processing apparatus cannot be ensured. Furthermore, the laser emitter may hit the workpiece during the adjustment and, thus, the laser emitter and/or the workpiece may be damaged.

What is needed therefore is laser processing apparatus addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
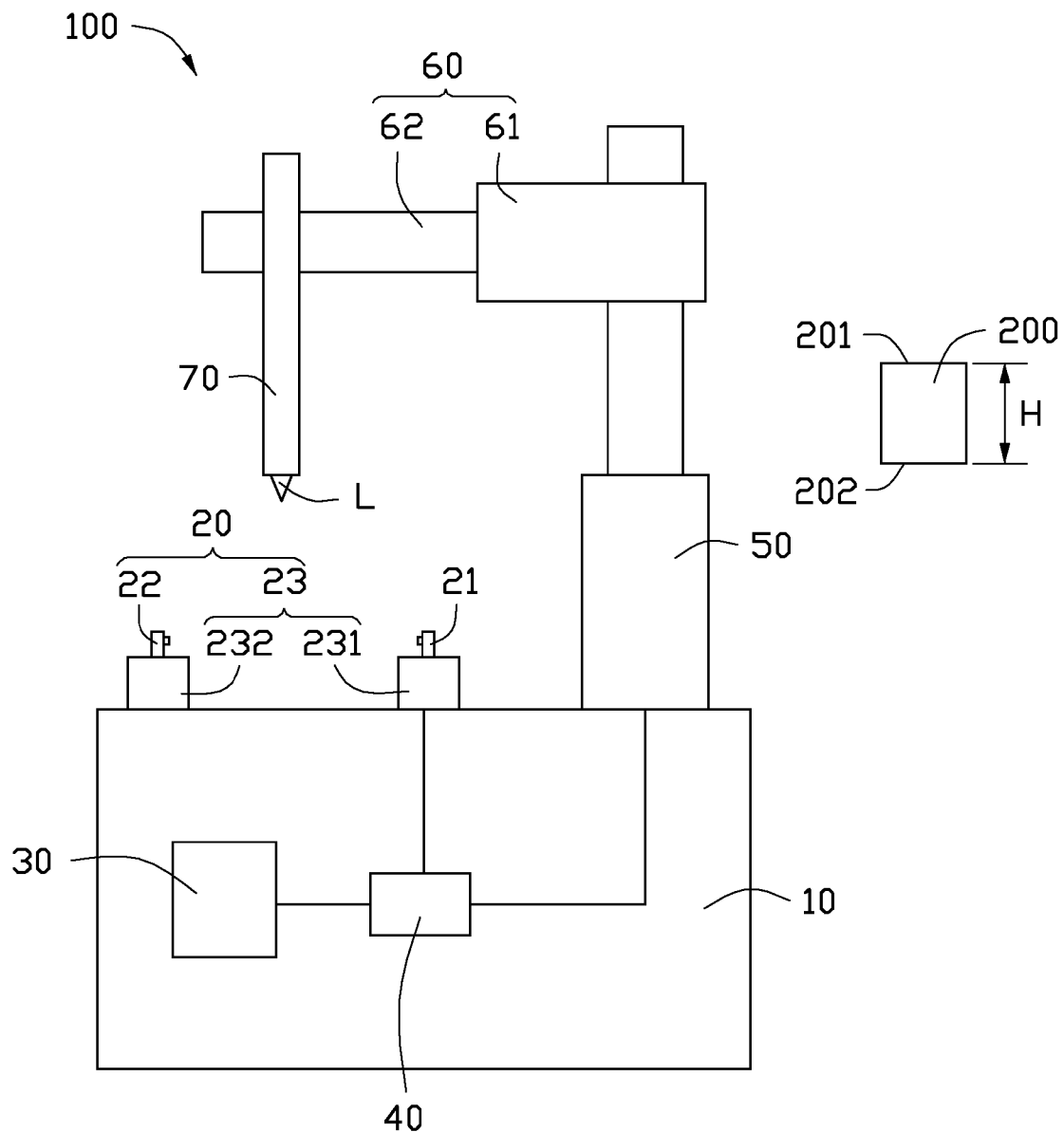
FIG. 1 is a schematic view of one embodiment of a laser processing apparatus.

FIG. 1 shows one embodiment of a laser processing apparatus 100 configured for processing a workpiece 200. The workpiece 200 includes a top surface 201 and a bottom surface 202 opposite to the top surface 201. The top surface 201 is the surface of the workpiece 200 to be processed. A thickness H of the workpiece 200, i.e., a distance between the top surface 201 and the bottom surface 202, may be, for example, about 500 millimeters (mm). In this embodiment, the workpiece 200 is a core of a mold (not shown). The laser processing apparatus 100 includes a worktable 10, a detecting unit 20, a user interface 30, a controller 40, a driving device 50, an adjusting arm 60, and a laser emitter 70.

The worktable 10 is substantially rectangular-shaped. The worktable 10 includes a supporting surface 101 (see FIG. 2) for supporting and positioning the workpiece 200 thereon.

The detecting unit 20 includes a signal emitter 21, a signal sensor 22, and a lifting device 23. The signal emitter 21 can be a laser emitter or an infrared emitter and, accordingly, the signal receiver 22 can be a laser sensor or an infrared sensor. In this embodiment, the signal emitter 21 is a laser emitter and the signal sensor 22 is a laser sensor. The lifting device 23 includes a first lifter 231 and a second lifter 232. The first lifter 231 and the second lifter 232 are positioned on the supporting surface 101 and are spaced from each other. The signal emitter 21 is fixed on a top surface of the first lifter 231, and the signal receiver 22 is fixed on a top surface of the second lifter 232. The signal emitter 21 and the signal sensor 22 are aligned with each other along a transmitting direction of signals emitted by the signal emitter 21, thus the signal sensor 22 can receive the signals emitted by the signal emitter 21.

The user interface 30 allows an operator to input information and thus to operate the laser processing apparatus 100. In this embodiment, the user interface 30 is positioned on a side surface of the worktable 200.

The controller 40 is electrically connected to the user interface 30 and the lifting device 23. The controller 40 is configured for controlling the first lifter 231 and second lifter 232 to move the signal emitter 21 and the signal receiver 22 toward or away from the supporting surface 101.

The driving device 50 is mounted on the supporting surface 101 and electrically connected to the controller 40.

The adjusting arm 60 includes a motor 61 and a fixing portion 62 connected to the motor 61. The laser emitter 70 is fixed on the fixing portion 62. The motor 61 is configured for driving the fixing portion 62 to move long a direction substantially parallel to the supporting surface 101, thus to drive the laser emitter 70 to move along the direction substantially parallel to the supporting surface 101. In this embodiment, the motor 61 is a step motor. At the same time, the driving device 50 can drive the adjusting arm 60 to move along a direction substantially perpendicular to the supporting surface 101. Therefore, the laser emitter 70 can be moved in directions parallel and perpendicular to the supporting surface 101.

The laser emitter 70 is configured for emitting laser L and projecting the laser L onto a surface to be processed, for example, the top surface 201 of the workpiece 200. In this embodiment, a focus length F of the laser emitter is 50 mm.

Figure 2:
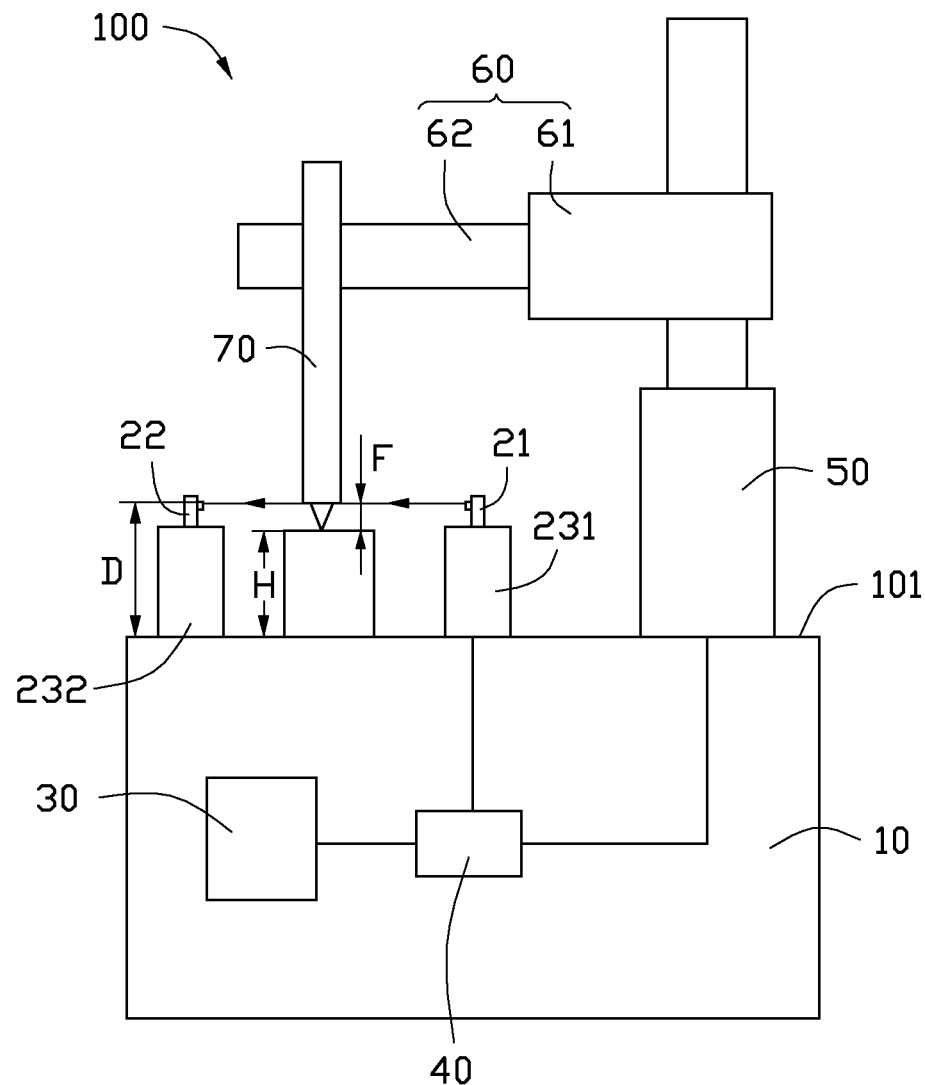
FIG. 2 is a schematic view of a first use status of the laser processing apparatus.

FIG. 2 shows that in use, the workpiece 200 is positioned on the supporting surface 101 of the worktable 10 between the first signal emitter 21 and the signal receiver 22, and the bottom surface 202 of the workpiece 200 is attached to the supporting surface 101. Before a laser processing operation, a thickness value V of the workpiece 200 should be input via the user interface 30, then the controller 40 controls the first lifter 231 and the second lifter 231 to adjust a distance D of the signal emitter 21 and the signal receiver 22 relative to the supporting surface 101, respectively. The distance D is equal to a sum of the input thickness value V and the focal length F of the laser emitter 70.

In FIG. 2, the input thickness value V is 500 mm, in other words, the thickness value of the workpiece 200 is correctly input, then the distance D of the signal emitter 21 and the signal receiver 22 relative to the supporting surface 101 is adjusted to 550 mm. Because the distance D is larger than the actual thickness of the workpiece 200, the signal sensor 21 can receive signals emitted by the signal emitter 22. The controller 40 controls the driving device 70 to adjust a height of the laser emitter 70 relative to the supporting surface 101 equal to the distance D. Then, the laser emitter 70 can be started to process the top surface 201 of the workpiece 200 under the drive of the adjusting arm 60.

Figure 3:
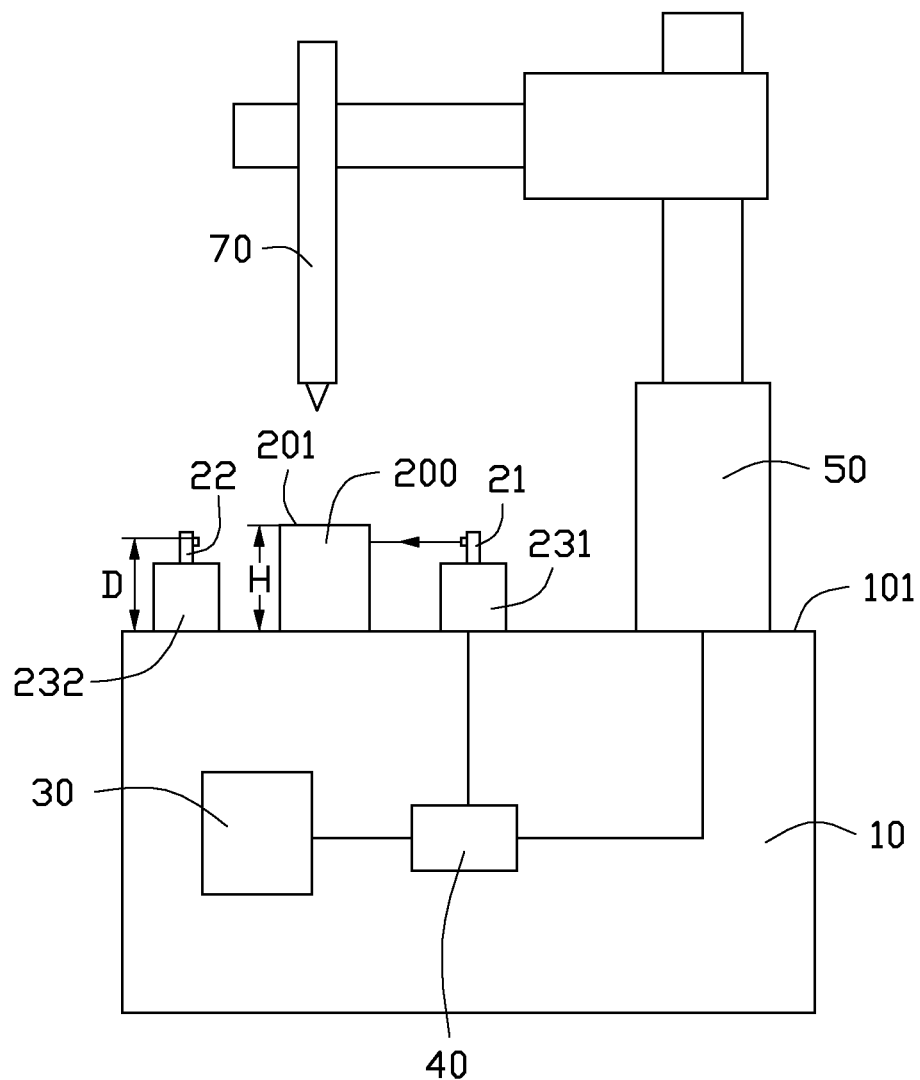
FIG. 3 is a schematic view of a second use status of the laser processing apparatus.

FIG. 3 shows that if a thickness value of the workpiece 200 is wrongly input, for example, the input thickness value V is 400 mm, the distance D of the signal emitter 21 and the signal receiver 22 relative to the supporting surface 101 is adjusted to 450 mm. Because the distance D is less than the actual thickness of the workpiece 200, signals emitted by the signal emitter 21 is blocked off by the workpiece 200, thus the signal sensor 22 cannot receive the signals. Then, the controller 40 determines that the thickness value of the workpiece 200 is wrongly input, and then stops to adjust the laser emitter 70.

Therefore, a hit between the laser emitter 70 and the workpiece 200, because of wrongly input information, can be avoided.

It is understood that if a wrong input thickness value is determined, the controller 40 generates warning information to notify an operator, the warning information can be shown by the user interface 30 or other devices. Then the operator can input the thickness value again or correct the wrong value, therefore, a processing precision of the laser processing apparatus 100 is ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A laser processing apparatus for processing a workpiece having a surface to be processed, the laser processing apparatus comprising:
    a worktable comprising a supporting surface for loading the workpiece thereon;
    a laser emitter configured for emitting a laser beam and focusing the laser beam, the laser emitter having a focal length;
    a driving device configured for adjusting a height of the laser emitter relative to the supporting surface along a direction substantially perpendicular to the supporting surface;
    a user interface allowing to input a thickness value of the workpiece;
    a detecting unit, comprising:
        a signal emitter configured for emitting detecting signals;
        a signal receiver configured for receiving the detecting signals emitted by the signal emitter, the workpiece being positioned between the signal emitter and the signal receiver during processing; and
        a lifting unit configured for adjusting a height of the signal emitter and the signal receiver relative to the supporting surface; and
    a controller electrically connected to the laser emitter, the driving device, the user interface and the detecting unit, the controller being configured for controlling the lifting device to adjust the height of the signal emitter and the signal receiver to be equal to a sum of the input thickness value and the focal length of the laser emitter, and controlling the driving device to adjust the height of the laser emitter if the signal receiver receives the detecting signals and controlling the driving device to stop to adjust the laser emitter if the signal receiver does not receive the detecting signals.

2. The laser processing apparatus of claim 1, wherein the controller controls the driving device to adjust the height of the laser emitter to be equal to a sum of the input thickness value and the focal length of the laser emitter if the signal receiver receives the detecting signals.

3. The laser processing apparatus of claim 2, wherein the controller generates warning information when a wrongly input thickness value of the workpiece is determined.

4. The laser processing apparatus of claim 1, wherein the lifting device comprises a first lifter and a second lifter spaced apart from the first lifter, the signal emitter is fixed on a top surface of the first lifter, and the signal receiver is fixed on a top surface of the second lifter.

5. The laser processing apparatus of claim 1, wherein the laser processing apparatus comprises an adjusting arm connected to the driving device, the laser emitter is fixedly connected to the adjusting arm, and the adjusting arm adjusts the laser emitter along a direction substantially parallel to the supporting surface.

6. The laser processing apparatus of claim 5, wherein the adjusting arm comprises a motor and a fixing portion connected to the motor, the laser emitter is fixed on the fixing portion, the motor drives the fixing portion to move long the direction substantially parallel to the supporting surface.

7. The laser processing apparatus of claim 6, wherein the motor is a step motor.

8. The laser processing apparatus of claim 1, wherein the signal emitter is a laser emitter, and the signal receiver is a laser sensor.

9. The laser processing apparatus of claim 1, wherein the signal emitter is an infrared emitter, and the signal receiver is a infrared sensor.

* * * * *